United States Patent [19]

LePoutre

[11] 4,328,284

[45] May 4, 1982

[54] COATING OF PAPER

[76] Inventor: Pierre F. LePoutre, 6 Westwood Dr., Pointe Claire, Quebec, Canada

[21] Appl. No.: 127,056

[22] Filed: Mar. 4, 1980

[30] Foreign Application Priority Data

Apr. 5, 1979 [CA] Canada .................................. 324932

[51] Int. Cl.[3] ........................ B05D 3/02; B32B 23/08; B32B 27/10

[52] U.S. Cl. .................................... 428/511; 427/382; 427/391

[58] Field of Search ................ 427/391, 382; 428/511, 428/512; 260/29.6 TA, 29.7 H, 29.6 H

[56] References Cited

U.S. PATENT DOCUMENTS

| | | | |
|---|---|---|---|
| 3,399,080 | 8/1968 | Vitkuske | 427/391 X |
| 3,873,345 | 3/1975 | Vreeland | 427/391 X |
| 4,112,192 | 9/1978 | Vreeland | 427/391 X |

FOREIGN PATENT DOCUMENTS

| | | |
|---|---|---|
| 673972 | 6/1952 | United Kingdom . |
| 680998 | 10/1952 | United Kingdom . |
| 1161402 | 8/1969 | United Kingdom . |
| 1298523 | 12/1972 | United Kingdom . |

*Primary Examiner*—Michael R. Lusignan
*Attorney, Agent, or Firm*—Stevens, Davis, Miller & Mosher

[57] ABSTRACT

The opacity and brightness of a sheet of paper coated with a composition comprised essentially of a pigment and a latex of a film-forming polymer are improved when the paper after being coated is dried under conditions adapted to prevent coalescence of the polymer particles of the latex during the drying step and then subjected to a treatment adapted to cause coalescence of the polymer particles, without subjecting the coating to compressive forces during this treatment step.

12 Claims, No Drawings

COATING OF PAPER

BACKGROUND OF THE INVENTION

This invention relates to the coating of paper with latex-based coating compositions. More particularly, it relates to a process for obtaining a brighter and more opaque coated paper and to paper coated in this way.

In order to provide good printing surfaces, it is normal to coat paper with aqueous-based compositions which have been formulated for this purpose. Among the compositions which have been used are coatings comprised essentially of a major proportion of a mineral or organic pigment and a minor proportion of a binder in the form of a latex of a film-forming polymer. Suitable pigments have included finely divided clay, calcium sulfoaluminate also known as satin white, oxides of titanium, aluminum, silicon and zinc, calcium carbonate and microsized particles of high softening point polymers which are insoluble in the binder. Suitable binder polymers have been those which are film-forming at ambient and higher temperatures. The coating is spread over the paper surface by a roll coater, trailing blade, air knife, brush or other known means, after which it is dried.

The method of drying the coated paper has generally involved heating it to a sufficiently high temperature to evaporate the water and cause coalescence of the polymeric binder particles. The particles of the binder polymer will coalesce when they are dried above the minimum film-forming temperature (MFT) of the polymer. Heating can be carried out by passing the coated paper through a hot air circulating oven or by contacting it with the surfaces of heated rolls or both. It is also known to dry the coating at a temperature below the minimum film-forming temperature of the binder particles to avoid coalescence of these particles and then subjecting the dried coating to a hot calendering treatment to cause coalescence of the particles and produce a glossy surface on the paper. For more details regarding the foregoing procedures see U.S. Pat. Nos. 3,399,080 and 3,873,345 and TAPPI (Technical Association of the Pulp and Paper Industry) Monographs 7, 9, 20, 22, 25, 26, 28 and 37. While coatings of acceptable opacity and brightness can be obtained by these known procedures, it is desirable to obtain coatings in which these and other properties are enhanced. For example, improvement in ink receptivity and gloss are also an ever present goal in the industry.

SUMMARY OF THE INVENTION

It has now been found that improvement in brightness, opacity and other properties can be obtained at equivalent coating weight in a paper coating containing a latex of a film-forming polymer as the binder and a pigment by a process comprising spreading a thin layer of the coating composition over a web of paper by one of the known means, drying the coating under conditions adapted to prevent coalescence of the polymer particles of the latex during the drying step and then subjecting the dried coating to a treatment designed to cause coalescence of the polymer particles of the latex without subjecting the coating to a compressive force. Other advantages of the process include the obtainment of equivalent optical properties at a reduced coating weight, possibly higher paper stiffness at equivalent coating weight (since the coating is more bulky) and higher uncalendered gloss. Higher uncalendered gloss means less calendering is required when increase in gloss is desired which in turn means less loss in opacity on gloss calendering since loss in opacity increases as the amount or degree of calendering is increased. The final coatings are also characterized by good pick resistance.

DETAILED DESCRIPTION

Coalescence of the binder polymer particles of the latex can be prevented during the drying process by maintaining the temperature below the minimum film-forming temperature (i.e. MFT) of the binder polymer. After the drying step has been completed, the coalescence of these particles can be caused to take place by heating the coating at a temperature above the MFT of the binder polymer. Coalescence can also be induced by other means such as by treating the dried coating with a solvent for the polymer, such as benzene for styrene-butadiene copolymers, for a time sufficient for coalescence to take place. To obtain the advantages of the present invention the application of compressive forces, for example calendering, must be avoided while carrying out the coalescence step. On coalescing, the polymer particles will not only fuse with each other, they will also bond with the other components in the coating composition and with the paper substrate.

The lactices which may be used for preparing the coating compositions are those known to be suitable for this purpose. The polymers may be homopolymers of $C_4$–$C_{10}$ dienes such as butadiene, 2-methyl butadiene, pentadiene-1,3, 2,3-dimethyl pentadiene-1,3, 2,5-dimethyl hexadiene-1,5, norbornadiene, ethylidene norbornene, dicyclopentadiene and halo-substituted derivatives of these compounds. The polymers also may be copolymers of the $C_4$–$C_{10}$ dienes with each other or with one or more copolymerizable monomers containing a $CH_2{=}C<$ group. Examples of these monomers are acrylic acid and its esters, nitriles and amides such as methyl acrylate, methyl methacrylate, acrylonitrile, methacrylonitrile, acrylamide, methylol acrylamide, acrolein, alpha and beta methyl acroleins, alpha-chloroacrylic acid, maleic acid, maleic anhydride, fumaric acid, itaconic acid, cinnamic acid, cinnamic aldehyde, vinyl acetate, vinyl chloride, vinylidene chloride, isobutylene, divinyl benzene, and methyl vinyl ketone. The polymers can also be homopolymers or copolymers of other copolymerizable monomers containing the $CH_2{=}C<$ group, e.g. vinyl alcohol, copolymers such as ethylene-vinyl acetate, ethylene-vinyl chloride, vinyl acetate-methyl methacrylate-acrylic acid-styrene, styrene-vinyl pyrrolidone, ethyl acrylate-vinyl pyrrolidone methyl methacrylate-butyl acrylate-acrylic acid, methyl methacrylate-ethyl acrylate-itaconic acid or any of the other polymers proposed as binders for paper coating applications. If desired, rubbery polymer latices may be blended with minor proportions of latices of hard or resinous polymers having a high MFT such as polystyrene, polyacrylonitrile, polymethyl methacrylate, copolymers of the monomers of these resinous polymers such as styrene-acrylonitrile resins and resinous copolymers of these monomers with other copolymerizable monomers such as copolymers of styrene with butadiene in which styrene forms more than 70 weight % of the polymer. Preferred are latices in which the copolymer is composed of about 0–60 weight % of a $C_4$–$C_6$ conjugated diolefin, 99.9–40% of a styrene and 0.1–5% of a polymerizable unsaturated monomer having a functional group in its structure, e.g. a $C_3$–$C_6$ mono- or dicarboxylic acid, the total of the percentages adding up to 100. The total solids content of the latices should be over 20% by weight and normally about 50% or more prior to compounding.

In addition to the pigment and latex binder components, the usual and known other additives may be included in the paper coating composition as required. Thus minor amounts of dispersing agents, e.g. sodium hexametaphosphate, other binders, e.g. starches and proteins, viscosity modifiers, e.g. sodium polyacrylate, defoamers, pH modifiers and other film-forming latices, etc. may be included.

The following examples are provided to further illustrate the invention. In these examples all parts are by dry weight unless specified otherwise.

The light scattering coefficients (LSC) were calculated using the Kubelka-Munk theory, from reflectance measurements performed at a wavelength of 458 nm over a black background and over a background of known reflectance. A description of the method and of the correction for the reflectance of the polyester film is given in J. Borch and P. Lepoutre, TAPPI 61 (2) 45 (1978). The light-scattering coefficients are expressed in units of reciprocal coat weight, as done customarily in the paper trade. The higher the LSC, the higher is the opacity at a given coat weight.

Brightness is the reflectance of an infinitely thick coating at a wavelength of 458 nm. It is not measured but calculated from the light-scattering and light-absorption coefficient of the coating—see J. V. Robinson, TAPPI 58 (10) 152 (1975).

Opacity is determined by TAPPI Standard Method T425.

75° gloss is determined by TAPPI Standard Method T480.

EXAMPLE 1

A coating composition composed of 100 parts of mechanically delaminated clay (alphaplate) and 20 parts of a latex of a carboxylated copolymer of 22 parts of butadiene and 76 parts of styrene having an MFT of 42° C. and an average particle size in the range of 150 nm–200 nm was spread by means of a wire wound rod over the surface of paper in an amount of 20 grams per square meter of paper. The coated paper was dried at room temperature, i.e. below the MFT of the polymer and the opacity of the coated paper was determined. Part of the dried paper was heated in an oven for 5 minutes at 100° C., i.e. above the MFT of the polymer to cause the polymer particles to coalesce while another part was passed through a gloss calender at a pressure of 500 pounds per linear inch (90 kN/m) and a temperature of 150° C. to dry the coating and cause coalescence by pressure and heat. The sheets were in contact with the hot roll of the gloss calender for about 5 seconds. After cooling, opacities were determined on the heat-treated coatings. The results are recorded in Table I.

TABLE I

| Conditions | | Opacity |
|---|---|---|
| Uncoated paper | | 83.0 |
| Coated paper | dried below the MFT | 92.0 |
| | dried below the MFT then gloss calendered at 150° C. and 90 kN/m | 93.6 |
| | dried below MFT and heated 5 min. in oven at 100° C. without calendering | 95.2 |

These results show that a significant improvement in opacity is obtained by avoiding calendering during the heat treatment.

EXAMPLE 2

A number of coatings composed of 100 parts of mechanically delaminated clay and 20 parts of the latex of Example 1 were spread over polyester films in an amount of 30 grams of coating per square meter of film and dried at room temperature. The dry coatings were then heated in an oven held at 45°, 52° and 90° C. to cause coalescence of the polymer particles. Light scattering coefficients were determined after various heating times. The results are recorded in Table II and show the effect of increasing the time and temperature of the heating step.

TABLE II

| Heating Temp. °C. | Heating Time Minutes | LSC($cm^2/g$) |
|---|---|---|
| Unheated | — | 1100 |
| 45 | 10 | 1200 |
| 45 | 20 | 1350 |
| 45 | 60 | 1460 |
| 45 | 200 | 1500 |
| 52 | 2 | 1470 |
| 52 | 5 | 1650 |
| 52 | 10 | 1650 |
| 90 | 2 | 1670 |
| 90 | 5 | 1820 |
| 90 | 10 | 1820 |

EXAMPLE 3

A number of coating compositions were prepared by mixing mechanically delaminated clay with various amounts of the carboxylated polymer latex of Example 1. The coatings were each spread over polyester films in amount of 30 grams per square meter of film and dried. One sample of each coating was dried at room temperature. Another sample of each coating was dried at room temperature and then heated for 10 minutes in an oven at 90° C. while a third sample of each coating was dried by placing it on a hot plate maintained at 90° C. Brightness, LSC and 75° gloss determinations were then made on each coating. The results are recorded in Table III and show the effect of varying the clay/polymer ratio. They also show large improvement in the brightness, 75° gloss and light scattering coefficient obtained by drying at below the MFT of the polymer before subjecting it to a temperature above its MFT without calendering, as compared to the results obtained with the conventional process i.e. by drying the coating at a temperature which is above the MFT of the polymer.

TABLE III

| Parts Latex Per 100 Parts Clay | Dried at Room Temperature | Dried at 90° C. on Hot Plate | Dried at Room Temp. Then Heated at 90° C. For 10 Mins. |
|---|---|---|---|
| | BRIGHTNESS | | |
| 10 | 0.810 | 0.817 | 0.839 |
| 20 | 0.826 | 0.781 | 0.857 |
| 30 | 0.834 | 0.630 | 0.864 |
| 40 | 0.837 | | 0.860 |
| | 75° GLOSS | | |
| 0 | 65 | | |
| 5 | 72 | 59 | 69 |
| 10 | 73 | 55 | 72 |
| 20 | 72 | 34 | 71 |
| 30 | 73 | 30 | 71 |
| 40 | 74 | | 65 |

TABLE III-continued

| Parts Latex Per 100 Parts Clay | Dried at Room Temperature | Dried at 90° C. on Hot Plate | Dried at Room Temp. Then Heated at 90° C. For 10 Mins. |
|---|---|---|---|
| | LSC ($cm^2/g$) | | |
| 0 | 1000 | | |
| 5 | 1000 | 1110 | 1200 |
| 10 | 1000 | 1100 | 1400 |
| 20 | 1100 | 850 | 1900 |
| 30 | 1200 | 150 | 1960 |
| 40 | 1200 | | 1790 |

EXAMPLE 4

A coating composition was prepared by mixing 20 parts of the latex of Example 1 with 100 parts of the delaminated clay. The composition was spread over a polyester film in amount of 30 grams per square meter of film, dried at room temperature and the light scattering coefficient of the coating was measured at a wavelength of 458 nm. The coating was then exposed to benzene vapours in a closed container for two hours at room temperature. After removal from the container they were conditioned for one week at room temperature and pressure, then the LSC of the coating was again measured. The results are recorded in Table IV and show the large increase in the LSC that is obtained by coalescing the polymer particles without calendering by exposure to a solvent.

TABLE IV

| | LSC ($cm^2/g$) |
|---|---|
| Dried coating - before exposure to solvent | 1100 |
| Dried coating - after exposure to solvent | 1700 |

EXAMPLE 5

Two sets of coating compositions were prepared from two carboxylated polystyrene latices—LYTRON* 2102 and 2203, by adding to samples of a 60% dispersion of delaminated clay in water, 5, 10, 20, 30 and 40 parts of these latices. The average particle sizes of these latices were about 100 nm and 200 nm and each polymer had a glass transition temperature of about 100° C. The coatings were spread over polyester films in amounts of 30 grams per square meter of film and the coated films were dried at room temperature. Light scattering coefficients were then determined on these coatings.

*Registered Trade Mark

The coatings were next heated for 5 minutes in an oven held at 150° C. following which the light scattering coefficients of the coatings were again determined. The results are recorded in Table V and show the large increase in opacity that is obtained by coalescing the polymer particles by the process of the present invention. They also illustrate the effect of particle size on opacity enhancement.

TABLE V

| Polystyrene parts per 100 of clay | Light Scattering Coefficient - $cm^2/g$ | | | |
|---|---|---|---|---|
| | Dried at room temp. but not heated | | Dried at room temp. then heated at 150° C. for 5 min. | |
| | Particle Size | | Particle Size | |
| | 100 nm | 200 nm | 100 nm | 200 nm |
| 0 | 1050 | 1050 | 1050 | 1050 |
| 5 | 950 | 1080 | 1360 | 1400 |
| 10 | 870 | 1110 | 1480 | 1600 |
| 20 | 550 | 1170 | 1470 | 1830 |
| 30 | 500 | 1240 | 1360 | 1960 |
| 40 | 470 | 1300 | 1200 | 1980 |

What is claimed is:

1. A process comprising applying a layer of a coating consisting essentially of a minor amount of a latex of a film forming polymer and a major amount of a pigment to a substrate, drying the coating at a temperature below the minimum film forming temperature of the polymer in the latex and under conditions adapted to prevent the coalescence of the polymer particles in the latex and subsequently heating the dried coating at a temperature at least as high as the minimum film forming temperature of the polymer without subjecting the dried coating to compressive force.

2. A process according to claim 1 wherein the film-forming polymer contains a functional group in its molecular structure.

3. A process according to claim 2 wherein the film-forming polymer is comprised of the copolymerization product of 0–60 weight % of a $C_4$–$C_6$ conjugated diolefin, 99.9–40% of a styrene and 0.1–5% of an unsaturated $C_3$–$C_6$ mono- or dicarboxylic acid.

4. A process according to claim 1 wherein the polymer particles in the latex are comprised in major proportion of a rubbery polymer having a lower minimum film-forming temperature and in minor proportion of a resinous polymer having a higher minimum film-forming temperature than the rubbery polymer.

5. A process according to claim 1 wherein a small proportion of a latex of a film-forming polymer having a minimum film-forming temperature lower than the drying temperature is also included in the coating.

6. A process according to claim 1 wherein the pigment is comprised of a delaminated clay.

7. A process according to claim 1 wherein the supporting substrate is paper.

8. A product made according to the process of claim 1.

9. A product made according to the process of claim 3.

10. A product made according to the process of claim 4.

11. A product made according to the process of claim 6.

12. A product made according to the process of claim 7.

* * * * *